Feb. 8, 1949.   A. G. BODINE, JR   2,460,918
METHOD OF AND APPARATUS FOR CUTTING AND THE LIKE
Filed Dec. 12, 1942

INVENTOR
ALBERT G. BODINE, JR.
BY
HARRIS, KIECH, FOSTER & HARRIS
Ward D. Foster
FOR THE FIRM
ATTORNEYS.

Patented Feb. 8, 1949

2,460,918

UNITED STATES PATENT OFFICE 2,460,918

METHOD OF AND APPARATUS FOR CUTTING AND THE LIKE

Albert G. Bodine, Jr., Burbank, Calif.

Application December 12, 1942, Serial No. 468,802

24 Claims. (Cl. 51—7)

My invention relates to a method of and apparatus for treating surfaces, and, since it finds particular utility in its application to the treating of surfaces in moving contact with each other, embodiments of my invention well adapted for such use will be described, it being understood that my invention is not limited to such application.

This application is a continuation-in-part of my copending application Serial No. 397,252, filed June 9, 1941, for Method and apparatus for cutting pipe, and which issued as Patent 2,304,793, on December 15, 1942.

The method and apparatus of my invention find utility both in cutting or abrading an article to provide a highly polished surface which is extremely smooth and in displacing or compressing an article to provide a peened surface, its advantages with respect to the former use being first described.

When an article has been formed to the desired shape, as by casting or rolling, its surface includes small projections and indentations. Likewise, when the surface of an article has been formed to the desired shape by any machine tool, there is formed in such surface a great number of tool scratches comprising alternate ridges and valleys. The removal of these ridges or projections to provide a polished smooth surface to the article diminishes the friction between such a surface and a like engaging and relatively moving surfaces, reduces the likelihood of corrosion of the surface, and prevents fractures which might otherwise occur in the valleys of the machine tool scratches or indentations of the unpolished surface.

It is an object of my invention to provide a method of and apparatus for providing such polished surfaces which involve no scuffing or burnishing or peening of the ridges between the machine tool scratches and which eliminate any detrimental local surface heating arising from the contact of the polishing agent with the crests between said scratches or with the projections, both by reducing to any desired degree the pressure of contact of the polishing agent with such crests or projections and by circulating with any desired velocity a cooling medium in contact with the surface being polished.

Another object of my invention is the provision of such a method and apparatus which polish surfaces to eliminate such machine tool scratches or projections with extreme rapidity, leaving no long, deep, or objectionable scratches of the polishing agent upon the polished surface.

Still another object of my invention is the provision of such a method and apparatus which will provide such a polished surface upon articles of complex shape and upon internal surfaces and which will utilize a distance of travel of the polishing elements which may be quickly and easily varied for different articles or the same article.

Other objects of my invention include the provision of such a method and apparatus providing such a polished surface free of scratches resulting from contact of the cut particles with the surface and free of any damage to the edges of the surface.

Still other objects of my invention include the provision of such a method and apparatus which involve the minimum of moving parts and the maximum of facility of assembling and operating the apparatus, and adaptation for treating articles of various shapes.

Among the objects of the application of my invention to the peening of the surface of an article are the provision of a method of and apparatus for subjecting such surface to contacts of peening members so that all of the desired surface area of the article is compressed uniformly, the provision of such a method of and apparatus for treating the surface which will permit its application to articles of irregular and complex shape, and the provision of such a method of and apparatus for treating a surface as will enable the impacts of the peening members to be readily varied between wide limits in the treatment of different articles or the same article. Other objects of this application of my invention are the provision of such a method and apparatus which will require few and simple parts for its performance or its embodiment and which will accomplish the peening of surfaces with great rapidity and with the minimum of supervision.

My invention contemplates the accomplishment of the foregoing objects in its application both to the polishing and peening of surfaces by the utilization of sound waves as means of transmitting energy to the polishing and peening members.

By sound waves is meant not only those frequencies of vibratory motion within the auditory range, but also other and higher frequencies travelling with the speed of sound waves of the auditory range through an elastic medium, which may be a gas or a liquid. Further, in accordance with my invention the sound waves transmitted may represent alternate increases and decreases in pressure relative to a mean pressure which may be greater than normal or atmospheric pressure or which may be less than the pressure of the medium at rest or atmospheric pressure.

In the transmission of sound waves through an elastic medium the movement of the particles of the medium is entirely local, each particle making small to-and-fro excursions in a manner similar to the vibrating body generating the sound waves, the particles moving in the same line as the direction of travel of the wave and only for a very short distance in the medium.

My invention contemplates using such movement of the particles of an elastic medium in response to sound waves for movement of abrasive or polishing members in contact with the surface bearing the machine tool scratches, for polishing the surface, and for causing movement of the peening members into impact pressural contact with the polished surface to compress such surface.

Further, my invention contemplates an amplitude of movement of the polishing or peening members which is greater than the amplitude of movement of such members when a single pressure or rarefaction impulse or sound wave, or a series of unrelated pressure or rarefaction impulses or sound waves is transmitted to such members. This I accomplish by establishing within the elastic medium transmitting the sound waves a resonant condition in which a large part of the energy supplied by the sound wave generator is stored in the medium by reflection of the sound waves in such a manner as to reinforce those originating with the generator to establish within the elastic medium a standing or stationary wave. Such reinforcement continues and increases with each wave generated and reflected until the energy consumed by friction and by the generation of heat and by overcoming the inertia of the members acted upon is equal to the energy input of the sound wave generator. Before such a condition of equilibrium is reached, the amplitude of the standing wave is so increased that its wave fronts are very steep, and the velocity and acceleration of the particles of the wave transmitting medium at the maximum velocity variation zones are extremely great and may be, and usually are, in great excess of the velocity and acceleration of the surface of the generator.

Embodiments of my invention capable of accomplishing the foregoing objects and providing the foregoing advantages and performing the method of my invention are illustrated in the accompanying drawing in which.

Figures 1, 3, 4:
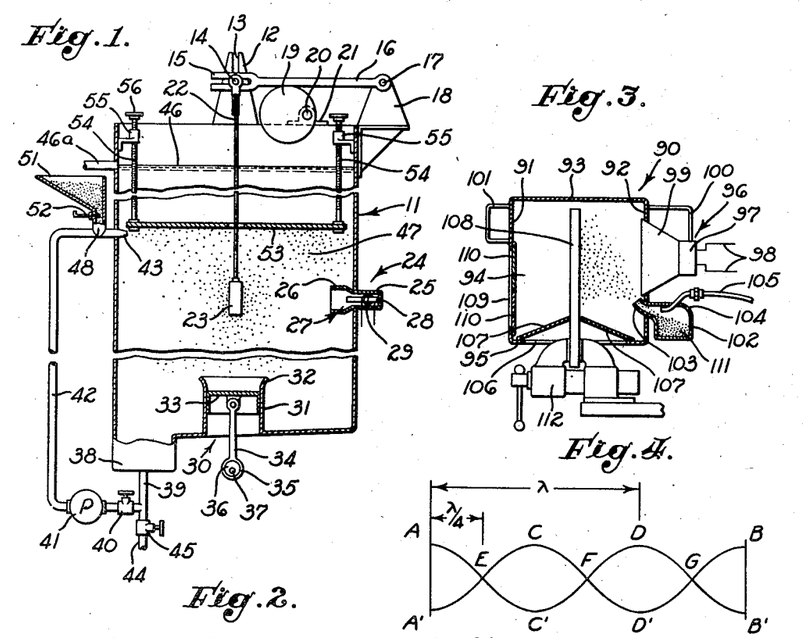
Fig. 1 is a vertical sectional view illustrating one embodiment of the apparatus of my invention capable of performing the method of my invention for polishing or peening the surface of an article.
Fig. 3 is a vertical elevational view of another embodiment of the apparatus of my invention, which is portable in form and capable of performing the method of my invention in polishing a surface.
Fig. 4 is a diagrammatic view of a stationary sound wave in the sound transmitting medium.

Referring to the drawing, which is for illustrative purposes only, the numeral 11 indicates a receptacle open at the top and provided with brackets 12 extending from opposite sides above the top thereof. Each of the brackets 12 has a slot 13 extending downwardly therein for the reception of a cross-bar 14 which is received between the bifurcated ends 15 of a vertical adjustment bar 16 which is pivoted at 17 to a bracket 18 secured to the receptacle 11. The vertical adjustment bar 16 rests intermediate its ends upon a disc 19 eccentrically mounted upon a shaft 20 carried by a bracket 21 attached to the receptacle 11. The disc 19 is provided with a hand-wheel and locking mechanism, not shown, and may be rotated about the shaft 20 to move the vertical adjustment bar 16 to and retain it in the desired position. Suspended from the cross-bar 14 as by a cable 22 is an article 23, the surface of which is to be treated in accordance with the method of my invention.

I have shown facing the article 23 a primary sound wave generator 24 as including a housing 25 secured to and extending through the side of the receptacle 11 and provided at its inner end with an outwardly flared reflector 26 serving to direct sound waves emanating from a magnetostriction bar 27 towards the articles 23. The magnetostriction bar 27 includes a metallic bar 28 having one end secured to the housing 25 and the other end projecting into the reflector 26, such bar being variable in length in response to the passage and interruption of the passage of current through a coil 29 wrapped therearound and connected to a source of high frequency alternating current, not shown.

The numeral 30 indicates a secondary sound wave generating device facing the bottom of the article 23 and including a cylinder wall 31 connected to and extending inwardly from the bottom of the receptacle 11 and provided at its inner end with an outwardly flared reflector 32 having the same function as the reflector 26 previously described. Supported in a suitable manner for reciprocation within the cylinder wall 31 is a piston 33 connected by a connecting rod 34 with a sleeve 35. Adapted for rotation within the sleeve 35 is a roller 36 which is eccentrically mounted upon a shaft 37 rotated in any suitable manner, as by an electric motor, not shown, so that its rotation causes the rapid reciprocation of the piston 33 within the cylinder wall 31.

Communicating with a sump 38 in the bottom of the receptacle 11 through a pipe 39 having a valve 40 therein is a pump 41, the outlet of which communicates through a pipe 42 with the interior of the receptacle 11 through a spray nozzle 43. A branch pipe 44 having a valve 45 therein connects the pipe 39 between the valve 40 and the receptacle 11 to waste.

The receptacle 11 is filled with liquid to the level indicated at 46, the liquid being maintained at this level by its overflow through a discharge pipe 46a.

The surface finishing is accomplished in accordance with my invention by a plurality of surface finishing elements, indicated by the numeral 47, which are suspended within the liquid in the receptacle 11. These surface finishing elements may be intermittently or continuously supplied to the liquid, as by the supply pipe 48, either alone or mixed with some of the liquid, or they may be supplied to the receptacle 11 in any suitable manner and maintained suspended or in a state of agitation in the liquid by agitation of the liquid, as for example, by closing the valve 46 and connecting the pipes 44 and 39, with the valve 45 open to a source of the liquid under pressure. If the surface of the article 23 is to be polished, surface finishing elements are formed of any desired abrasive capable on sliding contact with the surface of the article 23 of polishing this surface.

Figure 5:
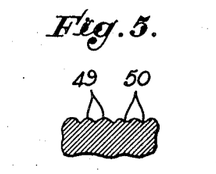
Fig. 5 is an enlarged fragmentary sectional view of an article having upon its surface machine tool scratches.

As illustrated in Fig. 5, the article 23 has on its surface alternating crests or ridges 49 and valleys 50, representing the scratches resulting from the action of the machine tool by which the article was given the desired form. Preferably the surface finishing elements employed for polishing the surface of the article 23 by the removal of the ridges 49 so that a smooth surface at the level of the lower portions of the valleys 50 is established are of dimensions greater than the distance between adjacent ridges 49, so that the abrasive action of their contact is spent upon the ridges 49. The surface finishing elements employed for polishing the surface may be full size grains of manufactured silicon carbide or aluminum oxide, each of which has several sharp points or edges on its boundary contour and definite cleavage planes so that it is individually friable.

The surface finishing elements 47 discharged from the supply pipe 48 pass downwardly in the liquid in the receptacle 11 with a speed dependent upon their mass and the viscosity of the liquid and the rate of recirculation established by the pump 41 or the effect of other agitating means for the liquid. During such movement in the liquid, the suspended surface finishing elements 47 are subjected to sound waves, which may be generated either by the primary sound wave generator 24 or the secondary sound wave generator 30 or both. If the coil 29 of the magnetostriction bar 27 is energized by connection to a source of high frequency alternating current, the bar 28 is varied in length, thus sending sound waves transversely of the liquid within the receptacle 11. These sound waves are reflected from the opposite side of the receptacle 11, and, if the frequency of the current passing through the coil 29 is adjusted to the proper value, the reflected sound waves reach the magnetostriction bar 27 at the proper times to reinforce the sound waves generated thereby.

Referring to Fig. 4, there is illustrated diagrammatically a sound wave within the liquid between the magnetostriction bar 27 and the opposite wall of the receptacle 11, assuming for illustrative purposes only that the distance between them is equal to one and a half wave lengths. In Fig. 4 the abscissa represents the distance across the receptacle 11 and the mean pressure at the level of the transmitted sound wave, and the ordinates represent variations in pressure above and below such mean value. It is apparent from Fig. 4 that there is a zone of maximum pressure variation at points AA' and BB' representing the reflecting wall of the receptacle 11 and the magnetostriction bar 27, respectively, and also at points CC' and DD' spaced therefrom and from each other a distance of half a wave length.

Separated a quarter wave length from each of the maximum pressure variation zones are zones of minimum pressure variation or maximum velocity variation, identified as E, F, and G. It is apparent from Fig. 4 that the surface finishing elements 47 at the maximum velocity zones E, F, and G, that is to say at distances equal to the odd multiples of a quarter wave length from the magnetostriction bar 27 and the reflecting wall of the receptacle 11, will have the maximum velocity and amplitude of movement. In order therefore to subject the surface of the article 23 to contact with the surface finishing elements 47 moving with the maximum velocity and amplitude, it is necessary only that the surface of the article be positioned from the magnetostriction bar 27 a distance equal to an odd multiple of a quarter wave length of the particular sound wave established under conditions of resonance across the receptacle 11. At such a zone the amplitude of movement of the particles of liquid and the surface finishing elements 47 is considerably greater than, and may be many times, that of the amplitude of movement of the vibrating end of the bar 28.

Since these particles of the liquid and the surface finishing elements reciprocate through this greater amplitude the same number of times per second as the frequency of the current actuating the bar 28, which may be extremely high, it will be apparent that the surface finishing elements adjacent the surface to be treated are oscillated or reciprocated with a velocity of an extremely high order.

Since the dimensions of the surface finishing elements 47 are greater than the distances between adjacent ridges 49, the elements 47 will cut or abrade only the ridges 49 until the ridges are cut away, this cutting or abrading being of a value dependent upon the mass and velocity of the surface finishing elements 47 and the viscosity of the liquid within the receptacle 11. The velocity of the surface finishing elements 47 is governed by the frequency and amplitude of movement of the bar 27 and hence by the energy input to the system and by the location of the surface finishing elements 47 contacting the surface of the article 23 with respect to the maximum velocity variation zones of the standing wave established in the liquid.

Dependent to some extent upon the relative size of the sound wave generator and the area of the surface to be treated is the divergence from normal to such surface of the direction of travel of the surface finishing elements 47 at the time of their impact with this surface. Thus, if the surface to be finished is comparatively large, the travel of the surface finishing elements 47 towards the surface as they approach impact is diverted so that they strike the surface a glancing, as contrasted with a direct, blow. This is not undesirable, since it causes the surface finishing elements 47 to exert a shearing, planing, or cutting action upon the ridges 49. When it is desired to enhance this action, the sound waves generated by the magnetostriction bar 27 may be directed at an acute angle with the surface of the article 23 to be finished, and for this reason my invention contemplates that the sound wave generator 24 may be adjustably connected to the receptacle 11, so that its angular relation with the wall thereof to which it is attached may be varied as desired.

It should be pointed out also that the direction of travel of the surface finishing elements 47 during contact with the surface of the article 23 is varied by their contact with each other, by the force of gravity, and by the agitation of the liquid, either by the circulation accomplished by the pump 41 or by other means. This results in a pattern of movement of great variety for the surface finishing elements 47, so that any scratches upon the ridges 49 and the polished surface of the article 23 are of extremely short length and extend in all directions and therefore do not detract from the desired degree of smoothness of the finished surface.

Furthermore, the depth of any such scratches upon the surface of the article 23 by impact of the surface finishing elements 47 thereon may be reduced to any desired minimum by reducing the mass of the surface finishing elements either by reducing their dimensions or selecting material for their composition of low specific gravity, or moving the surface of the article 23 transversely of the receptacle 11 so that it is spaced from the maximum velocity variation zone of the standing sound wave within the liquid, or by reducing the energy input to the system.

The article 23 may be raised or lowered within the liquid to secure a uniform treatment of its surface by rotating the disc 19 to raise or lower the adjustment bar 16 and shaft 14 to which the article 23 is connected by the cable 22. Likewise, by rotating the cable 22, the article 23 may be rotated to subject its entire surface, or as much thereof as is desired, to the action of the surface finishing elements.

I have described the use of the apparatus illustrated in Fig. 1 in the performance of the method of my invention energizing only the primary sound wave generator 24. If desired, instead of actuating this sound wave generator, the secondary sound wave generator 30 may be actuated, or, if desired either to reduce the degree to which the article 23 must be turned to cause the surface finishing elements 47 to move in a path more nearly parallel to the surface of the article 23 nearest the primary sound wave generator 24 or to subject the lower surface and the surface opposite such nearest surface to treatment by the surface finishing elements simultaneously with such treatment of such surface nearest the primary sound wave generator 24, the primary and secondary sound wave generators 24 and 30 may be simultaneously actuated.

The secondary sound wave generator 30 is actuated by the operation of the electric motor, not shown, rotating the shaft 37 and roller 36, thus reciprocating the piston 33 at the desired frequency. Such reciprocation of the piston 33 directs a train of sound waves vertically in the liquid, these waves being reflected from a reflector plate 53 supported in a horizontal position by adjustment rods 54 threaded through brackets 55 attached to the receptacle 11, so that rotation of hand-wheels 56 provided at their upper ends raises or lowers the reflector plate. The reflector plate 53 is adjusted with respect to the frequency of the sound waves generated in the liquid by the piston 33 so that resonance is established for the sound waves so generated. The frequencies of the primary and secondary sound wave generators 24 and 30 may be made the same, so that the amplitude of movement at an angle to the horizontal adjacent that surface of the article 23 nearest the primary sound wave generator 24 of the surface finishing elements caused by sound waves from the sound wave generator 24 is reinforced and amplified by the movement of such elements caused by the sound waves from the secondary generator 30, or these frequencies may be different or out of phase with each other to provide a pattern of movement of great variety adjacent this surface. The angular wave components from the two generators result in very complex movement of the cutting particles. These movement paths are called "Lissajous figures." The complex movement of the cutting particles is another important feature for preventing undesirable scratch formation in the finally finished surface.

It will be seen that that portion of the surface of the article 23 which is horizontal will be subjected to impact of the surface finishing elements 47 by the sound waves from the secondary generator 30 in the same manner as previously described for the impact of such elements upon the vertical surface of the article 23 in response to sound waves from the primary generator 24. However, the vertical surfaces of the article 23 are subjected to contact with the surface finishing elements 47 moving substantially parallel thereto in response to the sound waves generated by the secondary generator 30, and in a similar manner the horizontal surfaces of the article 23 are subjected to contact with such elements moving substantially parallel thereto in response to sound waves generated by the primary generator 24. The contact of the surface finishing elements with the surfaces of the article 23, while moving substantially parallel thereto, also subjects the ridges 49 and the entire surfaces when the ridges are removed to the level of the valleys 50 to a shearing or cutting action, providing an extremely smooth finish.

It will be seen that by raising and lowering the article 23 and the reflector plate 53 and rotating the article 23, any desired portion of the surface of the article 23 may be moved to any desired position with respect to the maximum velocity variation zones of the standing wave established in the liquid by the secondary sound wave generator 30.

The liquid within the receptacle 11 may be of any desired viscosity, such as water or oils of various specific gravities. While I have described the surface finishing elements employed for polishing the surfaces of the article 23 as being grains of manufactured silicon carbide or aluminum oxide, powdered carborundum, sand, or any other desired abrasive may be employed. As has been pointed out, the contact pressure of the surface finishing elements may be reduced to any desired minimum so that burnishing and peening of the ridges are prevented and a cutting stroke for such elements of the desired short length may be achieved, while avoiding the formation of objectionable new scratches and overheating.

Contributing to the avoidance of burnishing is the cooling effect of the liquid circulated in contact with the surfaces being treated by the circulation through or agitation in the receptacle 11 of the liquid and its movement in response to sound waves. Simultaneously with the accomplishment of these results the surface of the article 23 is polished with great uniformity and rapidity due to the extremely high velocity of the surface finishing elements 47 and their great number in contact with such surface.

If it is desired to peen the surface or a portion of the surface of the article 23, there are substituted for surface finishing elements of an abrasive nature, such as previously described, surface finishing elements of a non-abrasive nature, such as steel shot, small spheres of other hard metal, or the like. It is usually desirable in the practice of the peening method of my invention to employ a liquid of greater viscosity for the suspension of the surface finishing elements than is employed for the practice of the method of polishing of my invention. For example, an oil of comparatively great specific gravity may be utilized for the suspension of the non-abrasive surface finishing elements. While contact of the nonabrasive finishing elements with the surface of the article 23 during their travel substantially parallel to such surface acts to compress or peen the surface, the surface may be subjected to contact with the non-abrasive surface finishing elements travelling only substantially normal thereto by positioning the article 23 in a suitable manner with respect to the train of sound waves induced in the liquid by the sound wave generator and providing suitable screens or deflectors for screening the surfaces of the article which are not substantially normal to the direction of travel of the non-abrasive surface finishing elements induced by this wave train.

By varying the frequency of the sound waves generated and the position of the reflecting plate 53, a standing sound wave may be established, as previously described. By varying the position of the surface being treated with respect to the maximum velocity variation zones of the standing sound wave in the liquid and by varying the mass of the non-abrasive surface finishing elements and the energy input to the system, the amplitude of movement, velocity, and force of impact of the elements may be varied to vary the rate of peening of the surface. As previously described, the article 23 may be moved vertically and rotated within the liquid to subject any desired area of its surface to this peening action. The passage of liquid along the surface being peened caused by the circulation through or agitation in the receptacle 11 of the liquid and its movement in response to the sound waves cool the surface being treated and prevent any undesirable local heating.

By this performance of the method of my invention utilizing the apparatus of my invention illustrated in Fig. 1 and non-abrasive surface finishing elements as described, the surface of an article or any desired portion of such surface, even though irregular in form, may be peened or compressed, with the result that it is more resistant to fracture and may be subjected to greater stresses. This peening may be accomplished without polishing away the smaller projections resulting from castings or rolling or the machine tool scratches upon its surface.

Furthermore, the method and apparatus of my invention previously described may with great advantage be employed in providing a polished or extremely smooth surface with small pits or pores by utilizing as surface finishing elements particles of suitable size and suitable hardness compared with the surface being treated. These small pores or indentations in a highly polished, extremely smooth surface are of advantage in many instances for receiving and storing a lubricant and maintaining a proper film of the lubricant between the surface and a contacting bearing surface.

Figure 2:
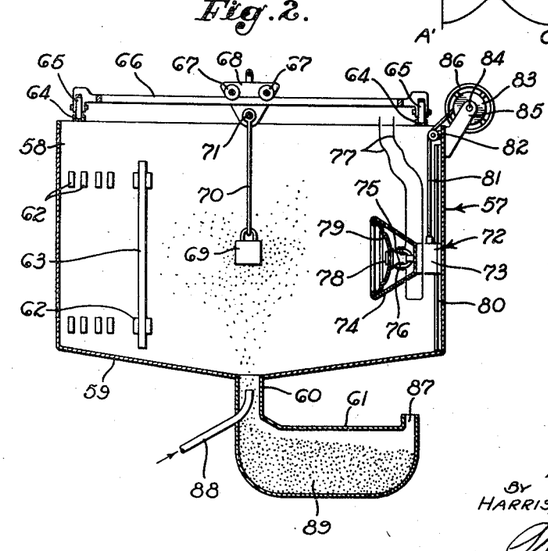
Fig. 2 is a vertical sectional view illustrating a different embodiment of the apparatus of my invention capable of performing the method of my invention in polishing a surface.

Illustrated in Fig. 2 is an alternative embodiment of an apparatus of my invention which is also capable of performing the method of my invention. Referring to this figure, the numeral 57 indicates a receptacle having side walls 58 and bottom walls 59 sloping downwardly to the center of the receptacle 57 and communicating with an induction pipe 60 leading to a storage tank 61.

The receptacle 57 is open at its top and provided with pairs of brackets 62 on opposite side walls 58 for the reception in any of a plurality of different positions of a reflector plate 63. Mounted upon the upper edges of these side walls 58 and extending across the receptacle 57 are tracks 64 for the reception of rollers 65 upon which there is mounted a yoke 66. Rollers 67 adapted for rolling along the yoke 66 are supported in a carriage 68 from which an article 69, the surface of which is to be treated, is suspended by a cable 70. The cable 70 is wrapped around a shaft 71 so that the article 69 may be raised or lowered in the receptacle to assume various positions with respect to a sound wave generator 72 which it faces. The sound wave generator 72 includes a support 73 to which an outwardly flared housing 74 is secured. A U-shaped magnet 75 is attached at its middle to the housing 74 and support 73 with its legs extending inwardly of the receptacle 57. A coil 76 of an electrical conductor is wrapped around the magnet 75 and connected by conductors 77 to a suitable source of alternating current, not shown.

Positioned adjacent the ends of the legs of the magnet 75 is an armature 78 which is secured to the center of a diaphragm 79 mounted within the inner end of the housing 74 so that it may vibrate or oscillate axially of the housing 74.

The support 73 is mounted for vertical movement upon brackets 80 secured to one of the walls 58 and is supported upon a cable 81 passing over a roller 82 secured to the wall 58 and wrapped around a drum 83. The drum 83 is mounted for rotation upon a shaft 84 supported by a bracket 85 attached to the wall 58 and provided with a hand-wheel 86 by which it may be rotated. The drum 83 is provided with suitable releasable locking mechanism, not shown, so that it may be releasably secured in position to retain the sound wave generator 72 at any desired level within the receptacle 57.

The supply tank 61 is provided with a breather pipe 87 communicating with the atmosphere at a point spaced from the induction pipe 60 and with a compressed air inlet pipe 88 delivering compressed air from a suitable source, not shown, to the induction pipe 60 and directing it upwardly therein. The supply tank 61 contains a body of surface finishing elements 89 of a nature suitable for the treatment of the surface of the article 69 when they are suspended in a gas and subjected to sound waves from the sound wave generator 72.

Utilizing this form of the apparatus of my invention in the practice of the method of my invention, the coil 76 is energized by a source of alternating current of the desired frequency, not shown, so that the diaphragm 79 is oscillated or vibrated, directing sound waves toward the reflector plate 63. The reflector plate 63 is disposed between those pairs of brackets 62 so that for the desired frequency each sound wave is reflected therefrom to return to the diaphragm 79 at the instant a new sound wave is produced therefrom, thus establishing a condition of resonance or a standing sound wave in the gas between the diaphragm 79 and the reflector plate 63.

The article 69 is moved transversely of the receptacle 57 by rolling the carriage 68 along the yoke 66 until the vertical surface thereof adjacent the sound wave generator 72 is at a zone of maximum velocity variation or as near thereto as desired. Compressed air being supplied through the pipe 88 causes air to be inducted through the breather pipe 87 and at a considerable velocity across the body of surface finishing elements 89, picking up some of them in suspension in the inducted air. The inducted air and the compressed air supplied by the pipe 88 are directed upwardly in the receptacle 57, so that the surface finishing elements are suspended in the air adjacent the vertical surface of the article 69 nearest the sound wave generator 72.

These surface finishing elements 89 are vibrated horizontally by the standing sound wave established in the air within the receptacle 57, their motion adjacent the vertical surface of the article 69 nearest the sound wave generator 72 being a motion resultant of the horizontal motion caused by the drag of the air moving horizontally in response to the standing sound wave, the vertical motion caused by the drag of the air moving vertically as a result of the upward discharge of air under pressure from the pipe 88 and the induction pipe 60, the downward movement of the surface finishing elements in response to gravity, and the deflection from horizontal and vertical of the horizontally and vertically moving surface finishing elements in response to their contact with each other and molecules of gas.

The surface finishing elements 89 adjacent the horizontal surfaces of the article 69 in a similar manner are vibrated in contact with such surfaces but travel substantially parallel thereto during such contact instead of more nearly normal thereto as in their travel adjacent the vertical surface of the article 69 nearest the sound wave generator 72. The movement of the surface finishing elements 89 adjacent the horizontal surfaces of the article 69 is likewise a resultant of those factors previously described.

The article 69 may be raised or lowered by adjusting the length of the cable 70 and may be rotated by twisting the cable 70 to polish all of its surfaces. Likewise, the article 69 may be moved transversely of the standing sound wave to ensure the uniform treatment of its surfaces. The carriage 68 may be rolled along the yoke 66 to position the surface under treatment at the zone of maximum velocity variation or as near thereto as is required to contact it with surface finishing elements moving with the desired amplitude.

In that form of apparatus of my invention illustrated in Fig. 3 the numeral 90 illustrates a receptacle having side walls 91 and 92, a top wall 93, end walls 94, and a bottom wall 95. A sound wave generator 96 is attached to the side wall 92. This sound wave generator 96 includes a housing 97 containing a suitable source of sound waves, such as a piezo-crystal, not shown, connected by conductors 98 to a source of alternating current, not illustrated.

Attached to the housing 97 and connecting it to the wall 92 is a reflector or directing member 99 for directing the sound waves transversely across the receptacle 90. A handle 100 is connected to the housing 97 and the wall 92, and a second handle 101 is connected to the opposite side wall 91, thus rendering the unit easily portable. A supply tank 102 is connected to the side wall 92 with its inlet spout 103 below the reflector 99 and directed upwardly and centrally of the receptacle 90. An air induction pipe 104 connects the supply tank 102 with the atmosphere, and a compressed air inlet pipe 105 connected to a suitable source of compressed air extends into the supply tank 102 below the air induction pipe 104.

The bottom wall 95 is provided with an opening 106 therein and closure members 107 adapted to embrace an article 108 extending through the opening 106 and between the closure member 107 into position facing the generator 96. A similar opening 109 is provided in the side wall 91 with similar closure members 110. The closure members 107 and 110, when no article is projected therebetween, close the openings 106 and 109, respectively, and, when an article is projected therebetween, prevent or limit the discharge of surface finishing elements 111 which are carried by the compressed and inducted air from the pipes 104 and 105 from a body of such elements in the supply tank 102 into the interior of the receptacle 90.

The frequency of the alternating current supplied through the conductors 98 to the piezo-crystal within the housing 97 being adjusted with respect to the distance between the piezo-crystal and the wall 91 of the receptacle 90 and the speed of sound in air so that a condition of resonance is obtained, there is inserted in the receptacle 90 an article such as the article 108, the surface of which is to be treated.

As illustrated in Fig. 3, the article 108 may be supported in any suitable manner, as by a conventional vise 112. The closure members 107, which may be resiliently urged by suitable spring mountings to their closed position and which may, if desired, be made of deformable material in whole or in part, permit relative movement of the article 108 and the receptacle 90 in the direction of the propagation of the sound waves from the generator 96, so that the surface of the article 108 subjected to contact with the surface finishing elements 111, moving substantially normal to such surface, may be positioned either at a zone of maximum velocity variation where the impact of the elements 111 is greatest or at such distance from such zone as to provide impact of the desired value.

The receptacle 90 may be vertically positioned by the operator by means of the handles 100 and 101, so that the desired area of the surface of the article 108 nearest the generator 96 may be uniformly treated.

If it is desired to subject the surface of the article 108 to contact with surface finishing elements 111 moving substantially parallel to such surface, the article 108 may be projected through the closure members 107 so that its horizontal surface is subjected to such contacts, the vertical surface of the article 108 being shielded from such contacts, if desired, or the article 108 may be inserted through the closure members 110, the vertical surfaces in such case being likewise shielded, if preferred.

Any desired frequency of sound waves may be employed in each apparatus, and in the performance of the method of my invention I have found that frequencies varying between 1,000 and 50,000 per second are suitable for polishing the surface of an article, and frequencies up to about 2,000 per second are suitable for peening such a surface.

In all three embodiments of the apparatus of my invention hereinbefore described the surface finishing elements, whether of an abrasive or non-abrasive nature, are actuated by the drag of molecules of a fluid moving in response to sound waves in the fluid, which may be liquid or gas. My invention contemplates in the use of these embodiments of the apparatus and in the performance of its method that there may be established a stream of the fluid having suspended therein the surface finishing elements, abrasive or non-abrasive, adjacent the surface to be treated, the stream being directed parallel to, or normal to, or at any desired angle with such surface. Such movement may be secured either by the agitation of the fluid adjacent the article in the manner described in connection with the three embodiments of the apparatus of my invention, or by positioning the spray nozzle 43 of the apparatus of Fig. 1, or the discharge of the induction pipe 60 of the apparatus of Fig. 2, or the discharge nozzle 103 of the supply tank 102 of the apparatus of Fig. 3 in the desired proximity to and angular relationship with the surface being treated.

The resultant motion of the surface finishing elements may therefore be that induced by the drag of the molecules of the fluid actuated by the sound waves, having superimposed thereupon the motion of such elements caused by the drag of the molecules of fluid induced by the velocity of the stream, as well as the motion of such elements caused by gravity.

Neither the apparatus nor the method of my invention is limited to the use of any particular sound generating means or to any number of such means directing sound waves at the surface to be treated, or to the angular relationship of the motion of the molecules of the fluid induced by such sound waves, or to the resulting motion of the surface treating elements.

It will be seen that, by varying the frequency of the sound waves generated, the location of the surface being treated with respect to the zones of maximum velocity variation, the mass of the individual surface finishing elements, and the energy input to the system, the method and apparatus of my invention may be very readily modified to provide any amplitude of movement and force of impact desired, and that, by varying the concentration of the surface treating elements suspended in the fluid, as well as these factors, the method and apparatus of my invention may be readily modified to vary the rate of the cutting action to the desired value.

Likewise, due to the very great velocity of the surface finishing elements, the surface may be cut or polished at an extremely high rate, while at the same time maintaining a force of impact of the individual surface finishing elements against, and an amplitude of their movement in contact with, the surface being treated of an extremely low order, with the result that there is no objectionable scratching, burnishing, peening, or local surface heating during the polishing of the surface.

Since any extremely shallow scratches which are formed by the contact of the surface finishing elements with the surface being treated moving in directions induced by a number of factors, including their deflection by contact with other surface finishing elements and molecules of the fluid contacting the surface, any such minute scratches are not objectionable, since they are extremely short and of no definite pattern. Contributing to the avoidance of the objectionable scratches and burnishing and local surface heating is the circulation of the fluid in which the surface treating elements are suspended in contact with the surface during treatment, which operates both to cool the surface during this treatment and to carry away particles of metal cut therefrom.

The suspension in a fluid of abrasive particles individually friable to present any sharp edges in the manner contemplated by my invention provides a cutting action superior to any capable of accomplishment employing a solid honing member in which such particles are embedded, since, when the particles are suspended in a fluid, they are free to rotate in all directions to present sharp edges to the surface being treated when other edges of the particles are dulled or smoothed.

While I have described the apparatus of my invention as being employed to treat the surface of only one article at a time and have described the method of my invention as being applied to single articles, it will be apparent that a plurality of articles may be simultaneously treated by immersion in the fluid carrying the suspended surface finishing elements. Likewise, my invention contemplates the treatment of the interior surface as well as the exterior surface of an article. Also, although I have illustrated and described uses of the apparatus and practices of the method of my invention as involving the movement of the surface finishing elements relative to the surface to be treated, my invention also contemplates the oscillation of the article to be treated relative to the surface finishing elements in response to sound waves. There is not excluded from my invention the screening or protecting of desired portions of the surface from the action of the sound waves and the surface finishing elements or the concentration of the sound waves and surface finishing elements against desired areas of the surface to be treated, by the use of screens, baffle members, reflectors, or deflectors of any desired shape.

If desired to vary the pattern of the paths of contact of the surface finishing elements with the surface being treated, the surface may be disposed at any desired angle with the direction of propagation of the sound waves adjacent thereto. Such an angular relationship facilitates the uniform polishing of surfaces of irregular form.

It will be apparent also that, by substituting non-abrasive surface treating elements for such elements of an abrasive nature, the method and apparatus of my invention will quickly, inexpensively, and uniformly peen and compress any desired area of an article, thus reducing its resistance to fracture.

As has been pointed out, the utilization of surface treating elements of suitable size and hardness as compared to the article being treated will provide the surface of the article with pores or pits of those dimensions and number increasing the lubricating effect of a lubricant between such surface and an adjacent bearing surface moving relative thereto.

Those embodiments of the apparatus of my invention and the method of my invention may be employed also for removing rust, paint, scale, or other foreign matter from the surface of articles or for roughening the surface by employing suitable amplitudes of movement for the particles and suitable dimensions and characteristics of the particles with a proper energy input to the system, sound waves of substantially sine form being generated by suitable generators for such purposes, as for the purposes previously described.

While the embodiments of the apparatus of my invention hereinbefore illustrated and described are fully capable of accomplishing the objects, and providing the advantages, and performing the method of my invention primarily stated, there are various other embodiments capable of accomplishing these objects and providing these advantages, and performing the method of my invention, and I therefore wish my invention to be understood as not restricted to the specific embodiments of the apparatus or the specific method hereinbefore described, but as including all of the modifications thereof which come within the scope of the claims which follow.

I claim as my invention:

1. A method of surface finishing the surface of an article, which includes the steps of: immersing such surface in a fluid; selectively oscillating the fluid adjacent such surface by applying pressure pulses to the fluid remote from such surface to propagate in the fluid waves characterized by their travel through the fluid under conditions of resonance with the speed of sound; supporting by the fluid a plurality of solid surface finishing elements adjacent such surface; and so relating the amplitude and frequency of such pressure pulses, the distance between the locus of their application and such surface, the mass of such elements, and the drag of the fluid upon such elements as to oscillate such elements with surface finishing momentum in contact with such surface.

2. A method as in claim 1 wherein said pressure pulses are applied directly through the fluid from a source facing said surface and immersed in said fluid.

3. A method of surface finishing an article, which includes the steps of: contacting such surface with a body of fluid; applying pressure energy in the form of pressure pulses to the fluid at a locus spaced from such surface; oscillating the fluid contacting such surface by converting a substantial portion of this pressure energy into velocity energy in the form of waves moving through said fluid under conditions of resonance; disposing a plurality of solid surface finishing elements in the fluid adjacent such surface; and so relating the amount of pressure energy applied, the frequency of the pressure pulses, the space between the locus of pulse application and such surface, and the masses of such elements as to oscillate such elements in directions substantially parallel to such surface and in surface-finishing relationship with such surface by such velocity energy.

4. A method of finishing a surface of an article, which includes the steps of: contacting such surface with a body of fluid; selectively oscillating the fluid adjacent such surface as compared with the fluid spaced from such surface by propagating in said fluid body waves characterized by their travel at the speed of sound under conditions of resonance; and disposing a plurality of small solid surface finishing elements in the fluid adjacent such surface, said waves being of such frequency and amplitude as to induce oscillation of such elements with surface finishing momentum in contact with such surface.

5. A method of surface finishing an article, which includes the steps of: contacting such surface with a body of fluid; applying pressure energy in the form of pressure pulses to the fluid at a locus spaced from such surface; oscillating the fluid contacting such surface by converting a substantial portion of this pressure energy into velocity energy in the form of waves moving through said fluid under conditions of resonance; disposing a plurality of solid surface finishing elements in the fluid adjacent such surface; and so relating the amount of pressure energy applied, and the frequency of the pressure pulses, the space between the locus of pulse application and such surface, and the masses of such elements as to oscillate such elements in surface-finishing relationship with such surface by such velocity energy.

6. A method of surface finishing an article, which includes the steps of: contacting such surface with a body of fluid; applying pressure energy in the form of pressure pulses to the fluid at a locus spaced from such surface; oscillating the fluid contacting such surface by converting a substantial portion of this pressure energy into velocity energy in the form of waves moving through said fluid under conditions of resonance; disposing a plurality of friable surface finishing elements in the fluid adjacent such surface; and so relating the amount of pressure energy applied, the frequency of the pressure pulses, the space between the locus of pulse application and such surface, and the masses of such elements as to oscillate such elements in surface-finishing relationship with such surface by such velocity energy.

7. A method of surface finishing an article, which includes the steps of: contacting such surface with a body of fluid; applying pressure energy in the form of pressure pulses to the fluid at a locus spaced from such surface; oscillating the fluid contacting such surface by converting a substantial portion of this pressure energy into velocity energy in the form of waves moving through said fluid under conditions of resonance; disposing a plurality of solid non-abrasive surface finishing elements in the fluid adjacent such surface; and so relating the amount of pressure energy applied, the frequency of the pressure pulses, the space between the locus of pulse application and such surface, and the masses of such elements as to oscillate such elements in surface-finishing relationship with such surface by such velocity energy.

8. A method of surface finishing an article, which includes the steps of: contacting such surface with a body of fluid; applying pressure energy in the form of pressure pulses to the fluid at a locus spaced from such surface; oscillating the fluid contacting such surface by converting a substantial portion of this pressure energy into velocity energy in the form of waves moving through said fluid under conditions of resonance; disposing a plurality of solid surface finishing elements in the fluid adjacent such surface, such elements being of different density than the fluid; and so relating the amount of pressure energy applied, the frequency of the pressure pulses, the space between the locus of pulse application and such surface, and the masses of such elements as to oscillate such elements in surface-finishing relationship with such surface by such velocity energy while such elements are moved by gravity in the fluid.

9. A method of surface finishing an article providing a surface, which method includes the steps of: circulating a fluid in sweeping contact with such surface; suspending a plurality of small solid surface finishing elements in the circulating fluid; oscillating the fluid adjacent such surface by propagating in such fluid waves characterized by their travel therethrough under conditions of resonance at the speed of sound; and so relating the amplitude and frequency of such waves to the mass of such elements as to oscillate such elements with surface finishing momentum in contact with such surface.

10. A method of surface finishing an article providing a surface, which method includes the steps of: circulating a stream of fluid in sweeping contact with such surface; suspending a plurality of small solid surface finishing elements in the circulating fluid; oscillating at least that portion of the stream which is adjacent such surface to establish therein a rapid to-and-fro vibration superimposed on the motion of such stream by propagating in such fluid waves characterized by their travel therethrough under conditions of resonance at the speed of sound; and so relating the amplitude and frequency of such waves to the mass of such elements as to oscillate such elements with surface finishing momentum in contact with such surface.

11. A method of surface finishing, including the steps of: suspending a plurality of small solid surface finishing elements in a fluid environment adjacent the surface to be finished; moving to and fro the fluid surrounding said surface finishing elements by propagating waves in the fluid under conditions of resonance at the speed of sound; and so relating the amplitude and frequency of the acoustic energy propagated in the fluid environment as to vibrate such surface finishing elements with surface finishing momentum in contact with such surface by the to-and-fro movement of the fluid surrounding such surface finishing elements.

12. A method of surface finishing, including the steps of: establishing a short-amplitude polarized vibration in a fluid, such vibration being characterized by its travel through the fluid under conditions of resonance at the speed of sound; disposing in such fluid a plurality of small solid surface finishing elements of such mass as to be swept to and fro an appreciable distance by the drag of molecules of the fluid; and so relating the amplitude of vibration of molecules of such fluid adjacent such surface to the mass of the surface finishing elements as to induce movement of such elements with surface finishing amplitude and pressural contact with such surface.

13. A method of surface finishing an article, which includes the steps of: contacting the surface to be finished with a body of fluid; suspending a plurality of solid surface finishing elements in such fluid; oscillating the fluid adjacent such surface by propagating in such fluid waves of substantially sine form characterized by their travel therethrough under conditions of resonance at the speed of sound; and so relating the amplitude of such waves to the mass of such elements as to oscillate such elements in surface finishing contact with such surface.

14. A method of surface finishing an article, which includes the steps of: contacting the surface to be finished with a body of fluid; suspending a plurality of solid surface finishing elements in such fluid; oscillating the fluid adjacent such surface by propagating in such fluid waves of substantially sine form characterized by their travel therethrough under conditions of resonance at the speed of sound; and so relating the amplitude of such waves to the mass of such elements as to reciprocate such elements substantially normal to and into contact with such surface with surface finishing momentum.

15. A method of surface finishing an article, which includes the steps of: contacting the surface to be finished with a body of fluid; suspending a plurality of solid surface finishing elements in such fluid; oscillating the fluid adjacent such surface by propagating in such fluid waves of substantially sine form characterized by their travel therethrough under conditions of resonance at the speed of sound; and so relating the amplitude of such waves to the mass of such elements as to reciprocate such elements substantially parallel with and in contact with such surface with surface finishing momentum.

16. A method of polishing a surface having spaced projections thereon, which includes the steps of: immersing such surface in a fluid; oscillating the fluid adjacent such surface by applying pressure pulses to the fluid remote from such surface to propagate in the fluid waves characterized by their travel through the fluid with the speed of sound; supporting by the fluid a plurality of solid polishing elements adjacent such surface; and so relating the amplitude and frequency of such pressure pulses, the distance between the locus of their application and such surface, the mass of such elements, and the drag of the fluid upon such elements as to oscillate such elements with surface finishing momentum in contact with such surface.

17. The method of polishing a surface having spaced projections thereon, which includes the steps of: immersing such surface in a fluid; oscillating the fluid adjacent such surface by applying pressure pulses to the fluid remote from such surface to propagate in the fluid waves characterized by their travel through the fluid with the speed of sound; supporting by the fluid a plurality of solid polishing elements adjacent such surface; and so relating the amplitude and frequency of such pressure pulses, the distance between the locus of their application and such surface, the mass of such elements, and the drag of the fluid upon such elements as to transmit such waves through the fluid under conditions of resonance and to oscillate such elements with surface finishing momentum in contact with such surface.

18. A method according to claim 17 wherein the fluid in which said surface is immersed and by which said polishing elements are supported is a liquid.

19. A method according to claim 17 wherein said pressure pulses are applied directly through the fluid from a source facing said surface and immersed in said fluid.

20. A method according to claim 17 wherein said pressure pulses are applied directly through the fluid from a source facing said surface and immersed in said fluid, said fluid being a liquid.

21. Apparatus for treating the surface of an article, which includes: a body of fluid; container means for said body; solid surface treating elements suspended in said fluid; means adapted for so supporting the article that the surface to be treated is contacted by said elements in said fluid; and means spaced from such surface to be treated and in contact with said fluid and adapted for generating within the fluid waves characterized by their travel therethrough under conditions of resonance at the speed of sound, which waves have their frequency and amplitude so related to the distance between said generating means and such surface and to the mass of said elements and to the drag of said fluid upon said elements as to vibrate said elements with surface finishing momentum in contact with the surface to be treated.

22. An apparatus as in claim 21 wherein said means for generating said waves is disposed to transmit said waves directly to said surface from said wave generating means.

23. A method of surface finishing the surface of an article which includes the steps of: immersing said surface in a fluid; applying pressure energy in the form of pressure pulses to the fluid remote from such surface to convert a substantial portion of said pressure energy into velocity energy in the form of waves moving through said fluid under conditions of resonance; disposing a plurality of solid finishing elements in the fluid adjacent said surface; and so regulating the amount of pressure energy applied to said finishing elements through said fluid and the frequency of the pressure pulses with respect to the characteristics of said elements as to oscillate said elements into surface finishing contact with said surface, said elements being non-abrasive, and adapted under influence of said pressure energy and pulses to peen said surface, said fluid being of relatively great viscosity comparable with that of oil of comparatively great specific gravity.

24. A method of surface finishing the surface of an article which includes the steps of: immersing said surface in a fluid; applying pressure energy in the form of pressure pulses to the fluid remote from such surface to convert a substantial portion of said pressure energy into velocity energy in the form of waves moving through said fluid under conditions of resonance; disposing a plurality of solid finishing elements in the fluid adjacent said surface; and so regulating the amount of pressure energy applied to said finishing elements through said fluid and the frequency of the pressure pulses with respect to the characteristics of said elements as to oscillate said elements into surface finishing contact with said surface, said elements being abrasive material and said fluid having a relatively low viscosity facilitating oscillation of said abrasive elements.

ALBERT G. BODINE, Jr.

REFERENCES CITED

The following references are of record in the file of this patent:

UNITED STATES PATENTS

| Number | Name | Date |
|---|---|---|
| 26,363 | May | Dec. 6, 1859 |
| 209,173 | Kidwell et al. | Oct. 22, 1878 |
| 209,177 | Maloney | Oct. 22, 1878 |
| 537,160 | King | Apr. 9, 1895 |
| 587,892 | Walter | Aug. 10, 1897 |
| 964,192 | Vanneman | July 12, 1910 |
| 1,977,516 | Kramer | Oct. 16, 1934 |
| 2,050,777 | Berger | Aug. 11, 1936 |
| 2,070,944 | Hillix | Feb. 16, 1937 |
| 2,298,775 | Raiche | Oct. 13, 1942 |
| 2,304,793 | Bodine | Dec. 15, 1942 |

FOREIGN PATENTS

| Number | Country | Date |
|---|---|---|
| 548,960 | Great Britain | Oct. 30, 1942 |